US009145070B2

United States Patent
Hayashi

(10) Patent No.: US 9,145,070 B2
(45) Date of Patent: Sep. 29, 2015

(54) SLIDE RAIL DEVICE FOR VEHICLE

(75) Inventor: Naoki Hayashi, Fujisawa (JP)

(73) Assignee: SHIROKI CORPORATION, Kanagawa (JP)

( * ) Notice: Subject to any disclaimer, the term of this patent is extended or adjusted under 35 U.S.C. 154(b) by 183 days.

(21) Appl. No.: 13/993,700

(22) PCT Filed: Nov. 17, 2011

(86) PCT No.: PCT/JP2011/076536
§ 371 (c)(1),
(2), (4) Date: Jun. 13, 2013

(87) PCT Pub. No.: WO2012/081353
PCT Pub. Date: Jun. 21, 2012

(65) Prior Publication Data
US 2013/0264454 A1    Oct. 10, 2013

(30) Foreign Application Priority Data
Dec. 13, 2010    (JP) .................. 2010-277514

(51) Int. Cl.
*F16M 13/00*    (2006.01)
*B60N 2/08*    (2006.01)
*B60N 2/07*    (2006.01)

(52) U.S. Cl.
CPC .............. *B60N 2/08* (2013.01); *B60N 2/0705* (2013.01); *B60N 2/0715* (2013.01); *B60N 2/0818* (2013.01); *B60N 2/0875* (2013.01); *B60N 2205/20* (2013.01)

(58) Field of Classification Search
CPC ..................................................... B60N 2/0715
USPC ......... 248/424, 429, 430; 297/344.11, 344.18
See application file for complete search history.

(56) References Cited

U.S. PATENT DOCUMENTS

| 5,524,504 | A | 6/1996 | Brandoli et al. |
| 7,717,392 | B2 | 5/2010 | Sakakibara et al. |

(Continued)

FOREIGN PATENT DOCUMENTS

| EP | 0543317 A1 | 5/1993 |
| JP | 7 195964 | 8/1995 |

(Continued)

OTHER PUBLICATIONS

International Search Report for PCT/JP2011/076536, Date of the actual completion of the international search: Nov. 30, 2011, Date of mailing of the international search report: Dec. 13, 2011.
Aisin Seiki Co Ltd., "Seat slide device," Patent Abstracts of Japan, Publication Date: Sep. 9, 2003; English Abstract of JP-2003 252086.
Shiroki Corp., "Seat Track," Patent Abstracts of Japan, Publication Date: Mar. 17, 2005, English Abstract of JP-2005 067217.

(Continued)

*Primary Examiner* — Gwendolyn W Baxter
(74) *Attorney, Agent, or Firm* — Millen, White, Zelano & Branigan, P.C.

(57) ABSTRACT

A vehicle slide rail device, which can support a movable member on an upper rail without jolting by utilizing a supporting portion and a supported portion, which device includes a lock spring generating an engagement-assisting biasing force in a same direction or a different direction from an engaging direction of a locking portion with lock grooves of a lower rail, and a supporting portion of the upper rail is provided with a pair of supporting surfaces, the space there between becoming mutually narrower with respect to the direction of the engagement-assisting biasing force, so that when the supported portion is positioned at a predetermined position by the engagement-assisting biasing force, the supported portion engages with both of the pair of supporting surfaces so that forward/rearward movement of the supported portion relative to the supporting surfaces is restricted.

6 Claims, 13 Drawing Sheets

(56) References Cited

U.S. PATENT DOCUMENTS

| | | |
|---|---|---|
| 2008/0231101 A1 | 9/2008 | Sakakibara et al. |
| 2011/0108697 A1 | 5/2011 | Ito et al. |
| 2013/0206950 A1* | 8/2013 | Hayashi .................. 248/429 |

FOREIGN PATENT DOCUMENTS

| | | |
|---|---|---|
| JP | 2003 252086 | 9/2003 |
| JP | 2005 67217 | 3/2005 |
| JP | 2005238929 A | 9/2005 |
| JP | 4013591 | 11/2007 |
| JP | 2010 18073 | 1/2010 |

OTHER PUBLICATIONS

Elcat Spa, "Device for longitudinally adjusting automobile seat," Patent Abstract of Japan, Publication Date: Aug. 1, 1995; English Abstract of JP-07 195964.

Shiroki Corp., "Seat track device," Patent Abstract of Japan, Publication Date: Jan. 28, 2010; English Abstract of JP-2010 018073.

Office Action for related Chinese Patent Application No. 201180059284.6 issued Feb. 28, 2015.

English Abstract of JP-2005238929, Publication Date: Sep. 8, 2005.

Extended Search Report for related European Patent Application No. 11849393.1 dated Mar. 23, 2015.

* cited by examiner

SLIDE RAIL DEVICE FOR VEHICLE

TECHNICAL FIELD

The present invention relates to a slide rail device for a vehicle which supports a seat in a slidable manner.

BACKGROUND ART

Patent Literature 1 is a prior art slide rail device for vehicle, which is equipped with a pair of left and right lower rails which are fixed to a vehicle interior floor, extend in the forward/rearward direction, include a large number of lock grooves arranged in a forward/rearward direction; a pair of left and right upper rails which support a seating portion of a seat and are slidably supported by the left and right lower rails; lock springs, supported by the upper rails and each having a locking portion which is disengageably-engageable with the lock grooves from below; and lock-release levers, wherein each lock-release lever is rotatable between a locked position, at which the lock-release lever does not act on the lock spring that is supported by the upper rail, and an unlocked position, at which the lock-release lever acts on the lock spring to eject the locking portion from the corresponding lock groove.

In this slide rail device, when an occupant applies no operating force to the lock-release levers, the slide position of the seat and upper rails with respect to the lower rails is maintained by the locking portion of each lock spring engaging with one of the lock grooves. On the other hand, upon a passenger rotating the lock-release levers to the unlock position against the biasing force of the lock springs, the locking portion of each lock spring disengages from the lock groove to thereby allow the seat and the upper rails to slide with respect to the lower rails.

Whereas, a slide rail device for a vehicle disclosed in Patent Literature 2 is equipped with a pair of left and right lower rails which are fixed to a vehicle interior floor, extend in a forward/rearward direction and include a large number of lock grooves, arranged in the forward/rearward direction; a pair of left and right upper rails which support the seating portion of a seat and are slidably supported by the left and right pair of lower rails; a lock lever which includes a locking portion, which is disengageably-engageable with the lock grooves from below and is supported by each upper rail to be rotatable in the upward/downward direction between a locked position, at which the locking portion is engaged with the lock grooves, and an unlocked position, at which the locking portion escapes from the lock grooves; and a biaser which rotatably biases the locking lever toward the locked position.

In this slide rail device, when an occupant applies no operating force to the lock lever, the slide positions of the seat and the upper rails with respect to the lower rails are maintained since the locking portion of each lock lever which is held in the locked position by the biasing force of the biaser is engaged with some of the lock grooves. On the other hand, upon an occupant rotating the lock lever to the unlocked position against the biasing force of the biaser, the locking portion of each lock lever is released from the engagement with the lock grooves to thereby allow the seat and the upper rails to slide relative to the lower rails.

CITATION LIST

Patent Literature

PATENT LITERATURE 1: U.S. Pat. No. 5,524,504
PATENT LITERATURE 2: Japanese Patent No. 4,013,591

SUMMARY OF THE INVENTION

Technical Problem

In the slide rail device for vehicle disclosed in Patent Literature 1, when in a locked state in which an occupant applies no operating force on the lock-release levers, the locking portion of each lock spring engages with (contacts) the lock grooves of the corresponding lower rail, and hence, no jolting occurs between the lock springs and the lower rails. Whereas, the upper rails support each lock spring at two locations by its own supporting portions so that each lock spring is slightly slidably movable in the forward/rearward direction. Accordingly, when an occupant sits on the seat in the locked state, the upper rails minutely move forwardly/rearwardly relative to the lock springs due to the load occurring by the occupant sitting down, so that there is a risk of an abnormal noise being generated between the lock springs and the upper rails (supporting portions).

In the slide rail device for a vehicle disclosed in Patent Literature 2, the lock levers are rotatably supported by the upper rails by fitting a pair of left and right hinge pins that are provided on each lock-lever, and project therefrom, into through-holes formed in left and right side walls of each upper rail. However, since it is certainly not easy to fit the left and right hinge pins into the left and right through-holes, assembling the lock levers in the upper rails was not an easy procedure.

An example of another construction for rotatably supporting the lock levers on the upper rails is to engage hinge pins that are provided on each lock lever, and projecting therefrom, with supporting grooves having an open end and formed on each upper rail from the open end side, and rotatably support the hinge pins via the supporting grooves. Since it is easy to engage the hinge pins with the support grooves, each having an open end, the operation of assembling the lock levers into the upper rails becomes easy due to this construction.

However, merely engaging the hinge pins into the supporting grooves would cause the hinge pins to jolt against the supporting grooves when the lock levers rotate, so that abnormal noise is generated between the hinge pins and the supporting grooves.

The present invention provides a slide rail device for a vehicle in which a movable member can be supported by the upper rails without jolting by utilizing a supporting portion and a supported portion which are formed on one and the other of the upper rail and the movable member.

Solution to Problem

A slide rail device for vehicle according to the prevent invention is characterized by a lower rail which extends in a forward/rearward direction and is provided with a large number of lock grooves, extending in an upward/downward direction, which are arranged in the forward/rearward direction, the lower rail being immovable relative to a floor of the vehicle; an upper rail which is supported by the lower rail to be slidable in the forward/rearward direction and provided with a supporting portion; a lock spring which is provided with a supported portion, which is supported by the supporting portion, and a locking portion which is disengageably-engageable with the lock grooves, wherein a biasing force of the lock spring biases the locking portion in a direction to engage with the lock grooves; and a lock release lever, supported by the upper rail, which is rotatable between a locked position, at which the locking portions allowed to engage with the lock grooves, and an unlocked position, at which the lock spring presses in a direction such that the locking portion escapes from the lock grooves against the biasing force. The lock spring generates an engagement-assisting biasing force in a same direction or a different direction from an engaging direction of the locking portion with the lock grooves. The supporting portion is provided with a pair of supporting surfaces, the space therebetween becoming mutually narrower with respect to the direction of the engagement-assisting biasing force, so that when the supported portion is positioned at a predetermined position by the engagement-assisting biasing force, the supported portion engages with both of the pair of supporting surfaces, so that forward/rearward movement of the supported portion relative to the supporting surfaces is restricted.

A slide rail device for vehicle according to the prevent invention, according to another embodiment, is characterized by a lower rail which extends in a forward/rearward direction and is provided with a large number of lock grooves, extending in an upward/downward direction, which are arranged in the forward/rearward direction, the lower rail being immovable relative to a floor of the vehicle; an upper rail which is supported by the lower rail to be slidable in the forward/rearward direction and provided with a supporting portion; a lock lever which is provided with a locking portion which is disengageably-engageable with the lock grooves, and a supported portion, supported by the supporting portion, which is rotatable between a locked position, at which the locking portion engages with the lock grooves, and an unlocked position, at which the locking portion escapes from the lock grooves; and a biaser which is supported by the upper rail and biases the lock lever toward the locked position. The biaser generates an engagement-assisting biasing force in a same direction or a different direction from an engaging direction of the locking portion with the lock grooves. The supporting portion is provided with a pair of supporting surfaces, the space therebetween becoming mutually narrower with respect to the direction of the engagement-assisting biasing force, so that when the supported portion is positioned at a predetermined position by the engagement-assisting biasing force, the supported portion engages with both of the pair of supporting surfaces, so that forward/rearward movement of the supported portion relative to the supporting surfaces is restricted.

The supporting portion can include a supporting groove having a cross-sectional plane that is substantially orthogonal to the leftward/rightward direction, wherein one end of the supporting groove is open and the width of the supporting groove becomes narrower toward the closed end thereof, and the supported portion extends in the leftward/rightward direction.

In this case, the supporting groove can be a V-groove.

The supporting portion can be a support projection, front and rear surfaces of which constitute the supporting surfaces, and wherein the supported portion is provided with a pair of front and rear clamping portions, which forwardly/rearwardly face front and rear the supporting surfaces.

The supported portion can have a round cross-sectional shape.

Advantageous Effects of the Invention

According to the invention of claim 1, when the supported portion of the lock spring is engaged with the supporting portion of each upper rail, since the supported portion engages with the pair of supporting surfaces at both sides by the engagement supplemental biasing force of the lock spring, the forward/rearward movement of the supported portion relative to the supporting portion is restricted. Accordingly, when an occupant sits down on the seat in a locked state in which the locking portion of each lock spring is engaged with the lock grooves of each corresponding lower rail, the upper rails do not minutely move forwardly/rearwardly relative to the lock springs, due to the load occurring by the occupant sitting down, so that an abnormal noise is not generated between the lock springs (supported portions) and the upper rails (supporting portion).

According to the invention of claim 2, when the supported portion of each lock lever engages with the supporting portion of each corresponding upper rail, since each supported portion engages with both of the pair of supporting surfaces by the engagement supplemental biasing force of the biaser, forward/rearward movement of the supported portions relative to the supporting portions is restricted. Accordingly, when an occupant sits down on the seat in a locked state in which the locking portion of each lock spring is engaged with the lock grooves of each corresponding lower rail, the upper rails do not minutely move forwardly/rearwardly relative to the lock springs, due to the load occurring by the occupant sitting down, so that an abnormal noise is not generated between the lock springs (supported portions) and the upper rails (supporting portion).

According to the invention of claims 3 and 5, the engagement of the supported portion with the supporting portion is more secure.

According to the invention of claims 4 and 6, since the supported portion of the lock spring or the lock lever becomes easier to rotate about its own axis with respect to the supporting portion of the upper rail, occurrence of abnormal noise can be effectively prevented.

DESCRIPTION OF EMBODIMENTS

Figure 1:
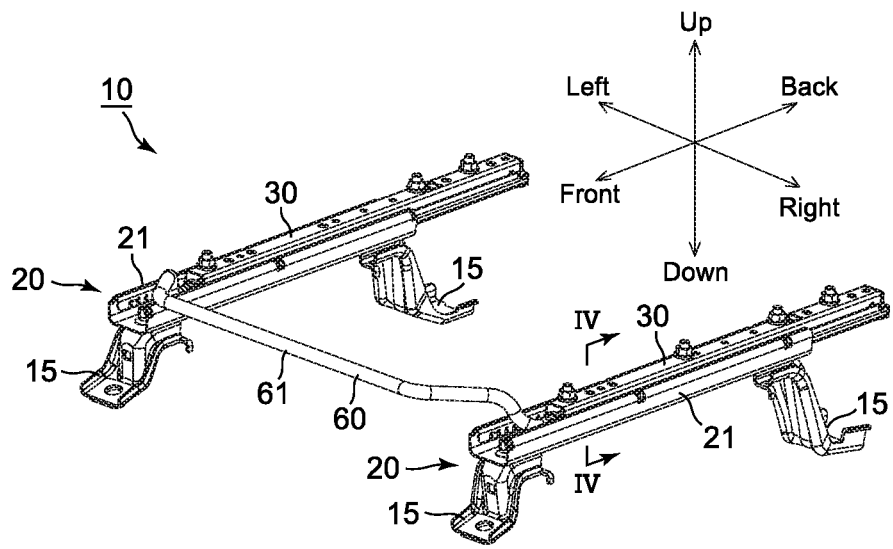
FIG. 1 is a front perspective view of an embodiment of the slide rail device, according to the present invention, viewed obliquely from above, in which the upper rails have been slided to the rear ends.
Figure 2:
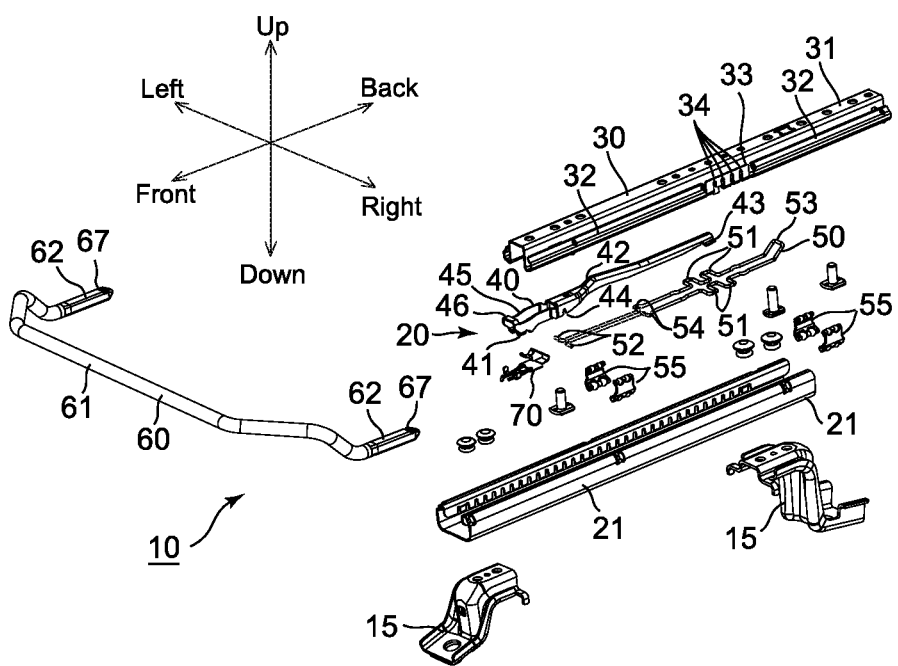
FIG. 2 is an exploded perspective view of the front of the slide rail device with the left rail unit omitted, viewed obliquely from above.
Figure 3:
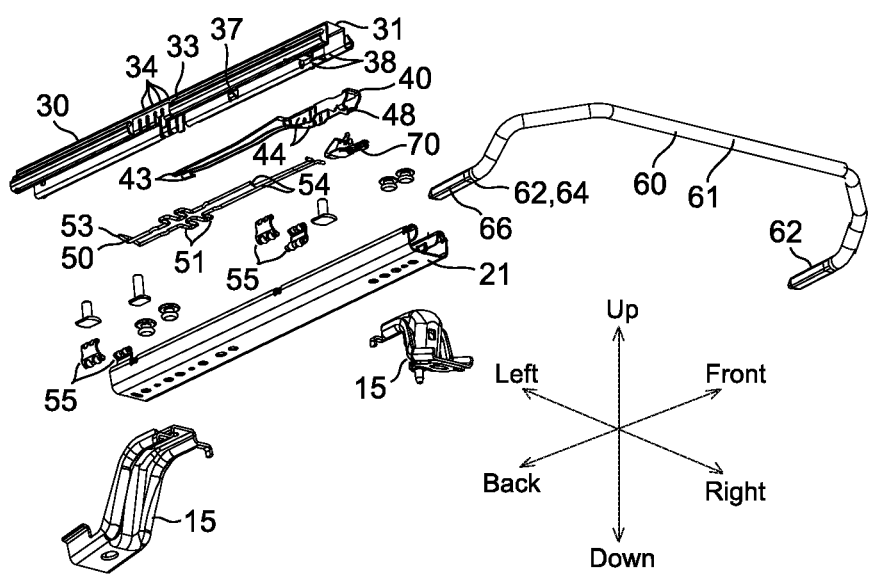
FIG. 3 is an exploded perspective view of the front of the slide rail device with the left rail unit omitted, viewed obliquely from below.

A first embodiment of the present invention will be hereinafter discussed with reference to FIGS. 1 through 19. Note that directions described in the following description are defined based on the directions of arrows shown in the drawings.

A slide rail device 10 is installed onto a vehicle interior floor of an automobile (vehicle) not shown in the drawings. A seat (not shown) is fixed to upper surfaces of the slide rail device 10 (upper rails 30).

The detailed structure of the slide rail device 10 will be discussed hereinafter.

The slide rail device 10 is provided, as large components thereof, with a pair of left and right rail units 20, and a loop handle 60 which connects the front ends of the left and right rail units 20. The left and right rail units 20 are bilaterally-symmetrical while the loop handle 60 has a bilaterally-symmetrical shape, and hence, the slide rail device 10 is bilaterally symmetrical as a whole.

The left and right rail units 20 have the following structure.

Figure 6:
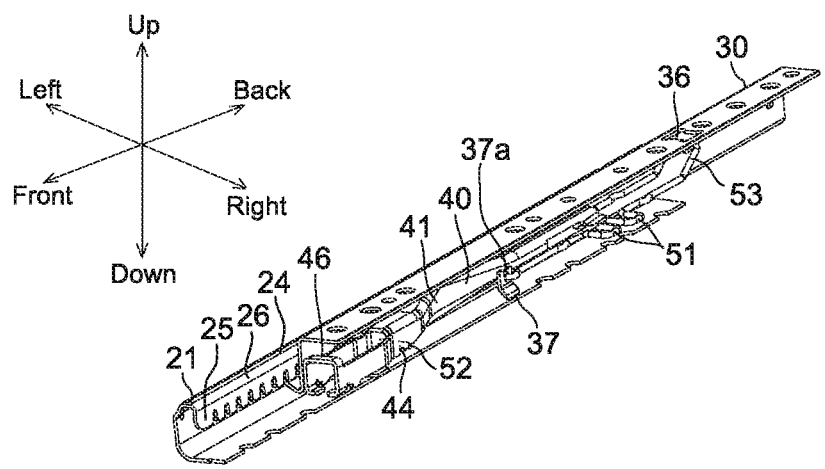
FIG. 6 is a front perspective view of the rail unit showing a cross sectional view of the lower rail, viewed obliquely from above.
Figure 8:
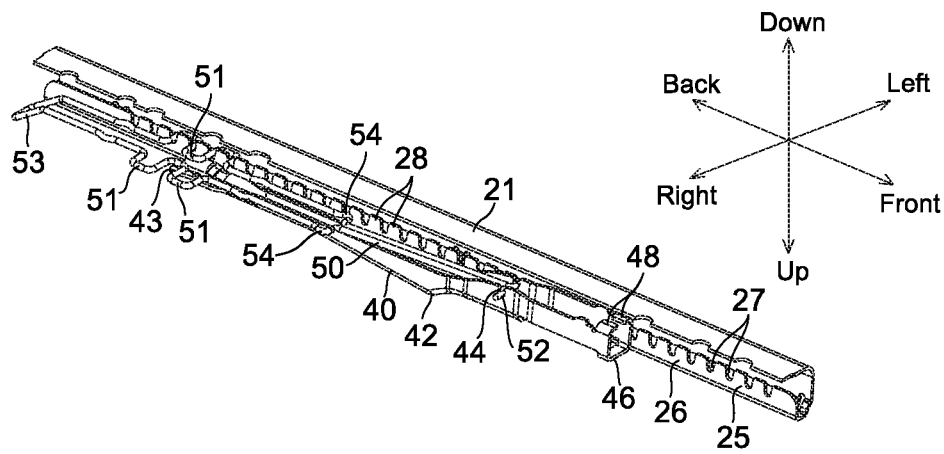
FIG. 8 is a front perspective view of the lower rail, shown as a longitudinal section view, the lock-release lever, and the lock spring, viewed obliquely from below.
Figure 9:
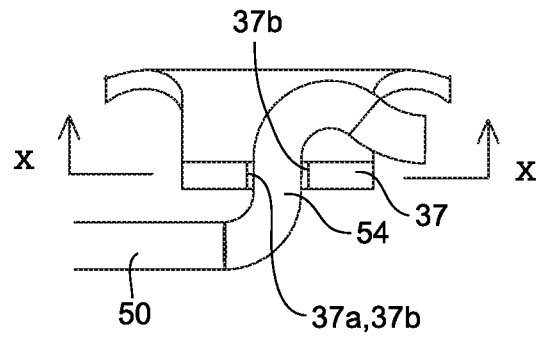
FIG. 9 is an enlarged plan view of an intermediate lock-engagement piece and a supported portion.

Each rail unit 20 is provided with a lower rail 21 which is mounted onto the vehicle interior floor via a pair of front and rear mounting brackets 15. Each lower rail 21 is a metal channel member which extends in the forward/rearward direction and the top thereof is open, and is provided with a substantially-horizontal bottom wall 22, a left and right pair of outer wall portions 23 which extend upward from the left and right sides of the bottom wall 22, respectively, and left and right pair of roof underside portions 24 which extend inward from the top edges of the left and right pair of outer wall portions 23, respectively, and a pair of left and right inner wall portions (vertical walls) 25 which extend downwardly from the inner edges of the left and right roof underside portions 24. As shown in FIGS. 6 and 8, etc., the upper edge portions of the left and right inner wall portions 25 (the portions connected to the roof underside portions 24) constitute base-end supporting portions 26 that extend in the forward/rearward direction. Lower edge portions of the left and right inner wall portions 25 are provided with a large number of lock teeth 27, the upper ends thereof connecting with the base-end supporting portions 26, arranged at equal intervals in the forward/rearward direction. Lock grooves 28, the bottom ends of which are open, are formed between mutually adjacent lock teeth 27.

Figure 5:
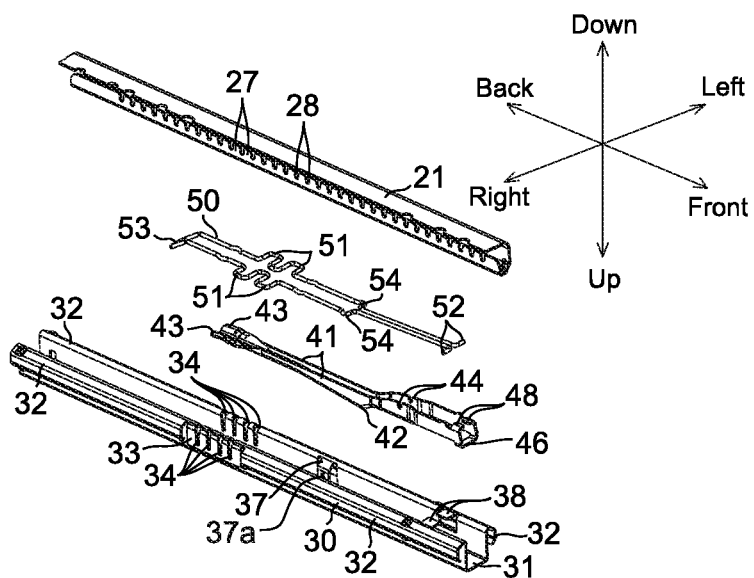
FIG. 5 is an exploded perspective view of a rail unit showing the lower rail in a longitudinal sectional view.
Figure 7:
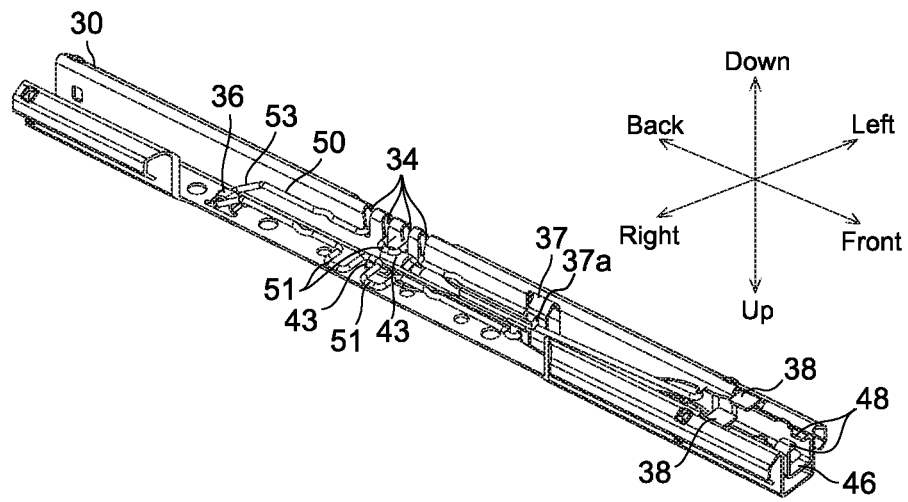
FIG. 7 is a front perspective view of the upper rail, with a section thereof cut-away, a lock-release lever, and a lock spring, viewed obliquely from below.
Figure 10:
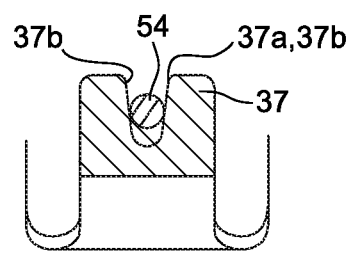
FIG. 10 is a cross sectional view taken along the X-X line shown in FIG. 9.
Figure 11:
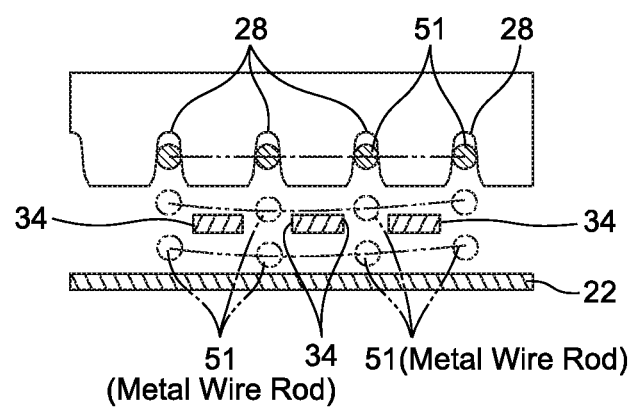
FIG. 11 is a schematic side elevational view showing states when the lock spring is positioned at the locked position and the lock-release position.

Each rail unit 20 is provided with an upper rail 30 that is slidable in the forward/rearward direction with respect to the associated lower rail 21. The upper rail 30 is a metal channel member which extends in the forward/rearward direction and the bottom thereof is open, and is provided with a base 31 having a substantially inverted U-shaped cross section, upright walls 32 which extend upward from lower end portions of the left and right side walls of the base 31, except central portions thereof in the longitudinal direction, and locking walls 33 which extend upward from the above-mentioned central portions of the side walls. As shown in FIGS. 5, 7 and 11, etc., four forward/rearward movement restriction grooves 34 are formed over the lower edges of the left and right locking walls 33 and the lower edges of the side walls of the base 31 to extend upward. In addition, as shown in FIGS. 6 and 7, etc., the base 31 is provided, in the vicinity of a central portion of the roof portion thereof, with a lock-engaging lug 36 which is formed by cutting and raising a portion of the base 31 to extend downward and rearward. Furthermore, intermediate lock-engaging lugs (supporting portions) 37, which are formed by cutting and raising portions of the left and right side wall portions of the base portion 31, are positioned slightly in front of central portions of the left and right side wall portions, and extend upward and inwardly away from the left and right side wall portions. A V-groove (supporting groove) 37a is formed on the upper edge of each intermediate lock-engaging lug 37 and extend downwardly therefrom. As shown in FIG. 10, front and rear supporting surfaces 37b of each V-groove 37a are anteroposteriorly symmetrical and the space therebetween in the mutually forward/rearward direction becomes gradually narrower with respect to a downward direction. Furthermore, substantially horizontal lower support portions 38, which project inwardly from the lower edges of the left and right side walls, are integrally provided on the base 31 near the front end thereof.

Each rail unit 20 is further provided with a lock release lever 40, a lock spring (lock member) 50, and a biasing spring 70 that are installed in the associated upper rail 30.

The lock release lever 40 is a press-molded metal channel member, formed from a metal plate, which extends in the forward/rearward direction and the bottom thereof is open, and is provided with a pair of left and right side walls 41. As shown in FIGS. 2, 5, 12 and 13, etc., a rotational contact protrusion 42 which extends in the leftward/rightward direction is protruded from an upper surface of the lock release lever 40. In addition, a pair of left and right substantially horizontal spring pressing-pieces 43 are respectively provided on the rear end portion of the lock release lever 40, and upward-facing spring-hook grooves 44 in the lower edges of the front portions (the portions positioned forward from the rotational contact protrusion 42) of the left and right side walls 41, respectively. As shown in FIG. 14, etc., a roof hole 45 is formed in the upper side of the lock release lever 40 in the vicinity of the front end thereof, and an upper supporting portion 46 is formed at the upper portion of the front end of the lock release lever 40 to connect the front ends of the left and right side walls 41. Furthermore, a spring-hook recess 47 is formed at the lower edge at the vicinity of the front ends of the side walls 41, and inwardly-facing substantially horizontal underside supporting pieces 48 are provided on the lower edges of the front ends of the left and right side walls 41.

A biasing spring 70 is a bilaterally-symmetrical member that is press-formed out of a metal plate. The biasing spring is provided with a flat-plate base-surface supporting portion 71; an upper-surface pressing piece 72 which extends rearwardly from the rear end of the base-surface supporting portion 71, and thereafter extends obliquely forward and upward, and thereafter extends obliquely forward and downward; a base-surface pressing piece 76 which extends obliquely forward and upward from a front edge of the base-surface supporting portion 71 and the front end of the base-surface pressing piece 76 is bent obliquely forward and downward; and a pair of left and right side arms 77 which extend forward from the front edge of the base-surface supporting portion 71. The rear end portion of the upper-surface pressing piece 72 forms an insertion end 73 having a substantially sideways V-shape, in a side elevational view, and a handle pressing portion 74, which is provided with a pair of left and right downward-facing lock-engagement pieces 75, is formed on the front end portion of the upper-surface pressing piece 72. Furthermore, upward-facing lock-engagement pieces 78 are provided on the left and right side arms 77, in the vicinity of the front ends thereof.

The biasing spring 70 is inserted into an internal space (the space located directly below the roof hole 45) of the front-end portion of the lock release lever 40 from the front-end opening (between the upper supporting portion 46 and the underside supporting pieces 48) of the lock release lever 40. When the biasing spring 70 is inserted, the insertion end 73 of the biasing spring 70 is inserted into the downward-facing U cross-sectional shaped portion of the lock release lever 40 (in a space located behind the space that is directly below the roof hole 45) (see FIG. 17), and furthermore, since the left and right side arms 77 are placed on the upper surfaces of the underside supporting pieces 48 and the upward-facing lock-engagement pieces 78 engage with the left and right spring-hook recesses 47 of the lock release lever 40 from below, biasing spring 70 becomes integral with the lock release lever 40.

The lock spring 50 is a bilaterally-symmetrical member formed by bending a metal wire rod, having a round cross-sectional shape. A pair of front and rear locking portions 51 which extend substantially horizontally outwards are formed on portions of both left and right side portions of the lock spring 50 which are positioned slightly behind central portions thereof in the longitudinal direction, respectively. The part of the lock spring 50 (except the rear end portion thereof) that is positioned behind the locking portions 51 is substantially horizontal when in a free state, and the part of the lock spring 50 (except the front end portion thereof) that is positioned in front of the locking portions 51 is substantially horizontal when in a free state. The lock spring 50 is provided at the front end thereof with a pair of left and right front-end locking lugs 52 which project outwardly in a substantially horizontal direction, and the rear-end portion of the lock spring 50 constitutes a rear-end lock-engaging portion 53, which is inclined upwardly in a side elevational view. Furthermore, a pair of left and right supported portions 54, extending in the leftward/rightward direction, are formed on the lock spring 50 at a substantially central portion thereof with respect to the longitudinal direction of the lock spring 50.

Figure 12:
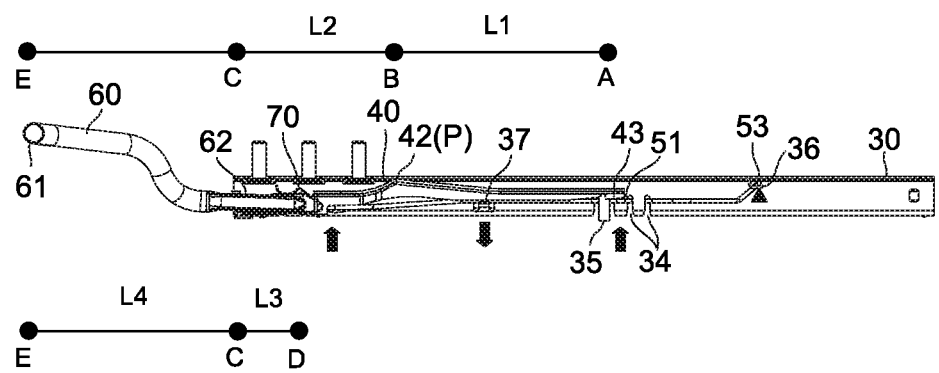
FIG. 12 is a side elevational view of the upper rail, the lock-release lever, a biasing spring and a loop handle, when in a locked state, in which only the upper rail is shown as a longitudinal section view.
Figure 13:
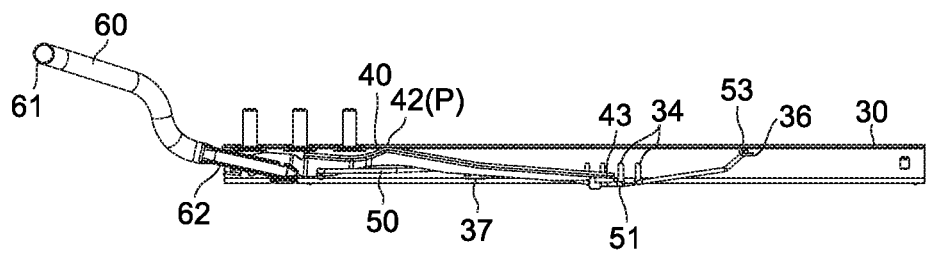
FIG. 13 is side elevational view similar to that of FIG. 12 when in an unlocked state, with the biasing spring omitted.
Figure 14:
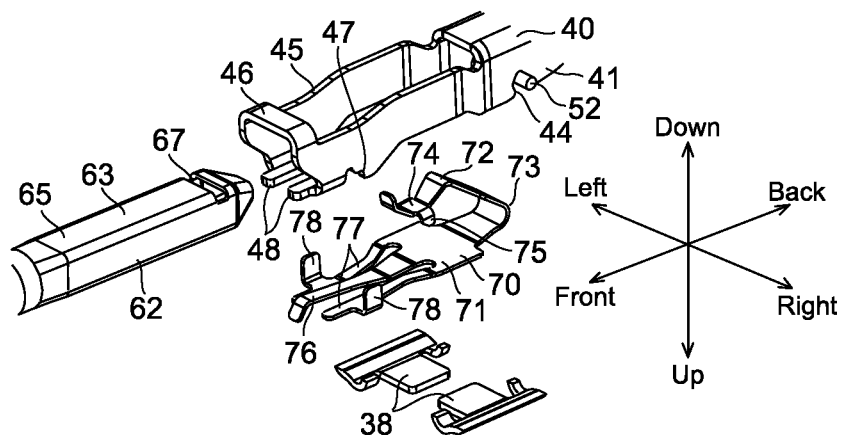
FIG. 14 is an enlarged exploded perspective view showing the front-end portion of the lock-release lever, the biasing spring, a lower supporting portion, and a rear-end portion of the loop handle.
Figure 15:
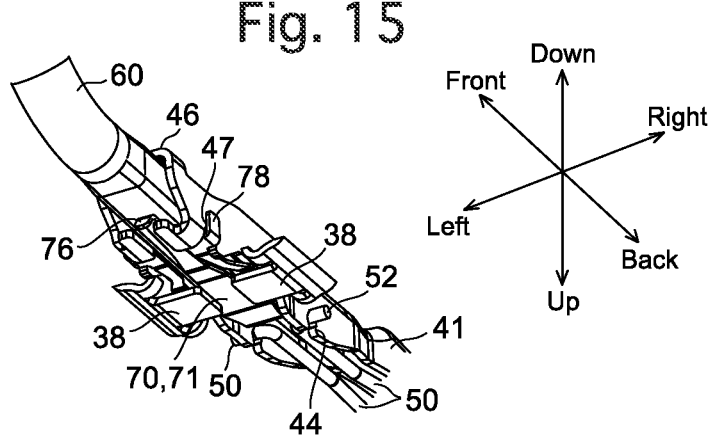
FIG. 15 is an enlarged perspective view of the front-end portion of the lock-release lever, the biasing spring, and the rear-end portion of the loop handle when mutually assembled with each other, viewed from below.
Figure 16:
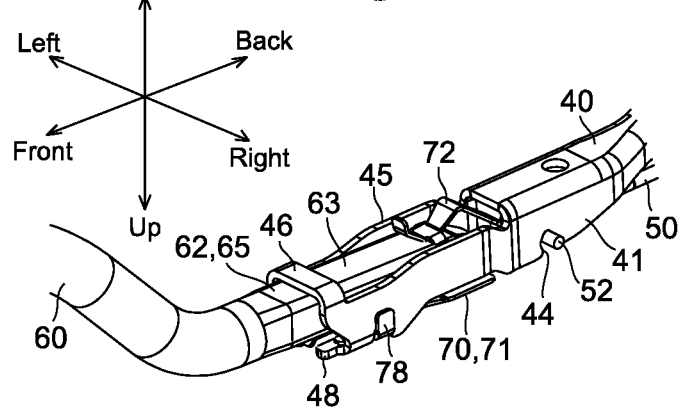
FIG. 16 is an enlarged perspective view of the front-end portion of the lock-release lever, the biasing spring, and the rear-end portion of the loop handle when mutually assembled with each other, viewed from above.
Figure 17:
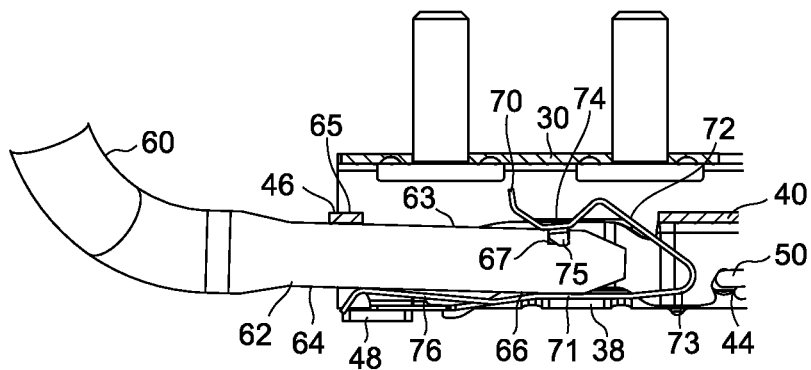
FIG. 17 is an enlarged longitudinal sectional view of the front end portions of the upper rail and the lock-release lever, the biasing spring and the rear end portion of the loop handle in a locked state.
Figure 18:
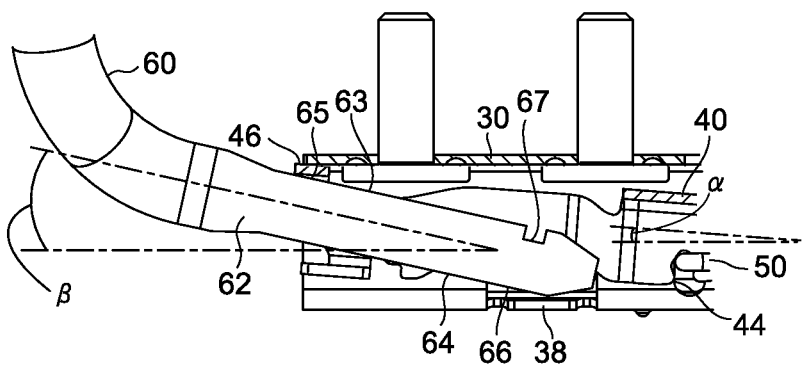
FIG. 18 is an enlarged longitudinal sectional view, similar to that of FIG. 17, in an unlocked state with the biasing spring omitted.
Figure 19:
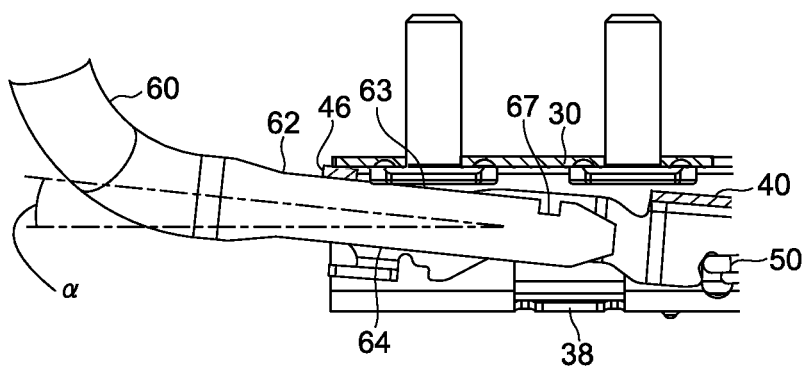
FIG. 19 is an enlarged longitudinal sectional view, similar to that of FIG. 17, of a comparative embodiment having a configuration in which the loop handle does not contact the lower supporting portion in an unlocked state.

The lock release lever 40 (and the biasing spring 70) is almost entirely accommodated in the associated upper rail 30 from the front end opening thereof (between the front end portion of the base 31 and the lower support portions 38) (as shown in FIGS. 17 and 18, only the front end portion of the upper supporting portion 46 projects forwardly from the upper rail 30), and the rotational contact protrusion 42 is in contact with a roof undersurface of the base 31 (see a contact portion "P" in FIGS. 12 and 13. Spaces are formed between the upper surface of the lock release lever 40 except the rotational contact protrusion 42 and a roof undersurface of the base 31). As shown in FIGS. 6 through 8, FIG. 12 and FIG. 13, in the lock spring 50, (the rear end portions extending in the leftward/rightward direction of) the rear-end lock-engaging portion 53 is lock-engaged with the lock-engaging lug 36 (see the triangular mark in FIG. 12), the left and right supported portions 54 are respectively lock-engaged with the V-grooves 37a of the left and right the intermediate lock-engaging lugs 37 from above, each locking portion 51 is engaged with an associated forward/rearward movement restriction groove 34 from below, and furthermore, the left and right front-end locking lugs 52 are lock-engaged with the spring-hook grooves 44 from below, and the spring pressing-pieces 43 come in contact with the upper surface of the portion positioned between the pair of locking portions 51 of the lock spring 50 from above. In addition, the front portion and the rear portion of the lock spring 50 produces an upward biasing force (elastic force) by being elastically deformed (see arrows ↑ shown in FIG. 12), and accordingly, this biasing force causes the rotational contact protrusion 42 of the lock release lever 40 to be pressed against the roof underside portion of the base 31, which allows the lock release lever 40 to rotate about the rotational contact protrusion 42 (about an imaginary rotation axis in the leftward/rightward direction) about the contact portion P between the roof underside portion and the rotational contact protrusion 42, and the lock release lever 40 is held in the locked position shown in FIGS. 12 and 17 when no upward external force is exerted on the front end portion of the lock release lever 40. On the other hand, exerting an upward external force on the front end portion of the lock release lever 40 against the biasing force of the lock spring 50 causes the lock lever 40 to rotate to the unlocked position shown in FIGS. 13 and 19. Thereupon, as shown in FIGS. 13 and 19, since the spring pressing-pieces 43 of the lock release lever 40 downwardly depress the portions of the lock spring 50 which are positioned between the pair of locking portions 51, each locking portion 51 escapes downward from the associated lock groove 28 (see the locking portions 51 indicated with the imaginary lines shown in FIG. 11). Furthermore, part of the component force of the biasing force that occurs by the lock spring 50 elastically deforming becomes the biasing force (engagement-assisting biasing force) that downwardly biases the periphery of the supported portions 54 (see the arrow 1 in FIG. 12), and this component force moves and biases the supported portions 54 toward the lower end of the V-grooves 37*a*. Accordingly, when the supported portions 54 reach a predetermined upward/downward position, the supported portions 54 contacts the front and rear supporting surfaces 37*b* at two front and rear positions, and this contacting state is maintained by the aforementioned biasing force.

Figure 4:
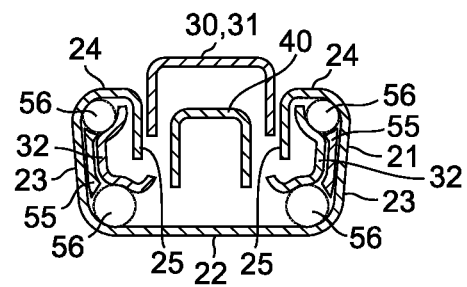
FIG. 4 is a cross sectional view taken along the line IV-IV shown in FIG. 1.

An assembly made by inserting an upper rail 30, a lock release lever 40 and a lock spring 50, which are integrated in the above described manner, into one lower rail 21 from the front end opening or rear end opening of the lower rail 21 constitutes a rail unit 20. When a rail unit 20 is assembled, the upright walls 32 and the locking walls 33 of the upper rail 30 enter the spaces formed between the outer wall portions 23 and the inner wall portions 25 as shown in FIG. 4 (the locking walls 33 are omitted in FIG. 4), and a plurality of bearing balls 56 which are rotatably supported by retainers 55 installed in the aforementioned spaces are in rotatable contact with both outer surfaces of the upright walls 32 and inner surfaces of the outer wall portions 23, which allow the upper rail 30 (and the lock release lever 40 and the lock spring 50) to slide in the forward/rearward direction with respect to the lower rail 21. Furthermore, since a front-end stopper and a rear-end stopper, which are omitted from the drawings, are provided between the upper rail 30 and the lower rail 21, each upper rail 30 is slidable relative to the lower rail 21 between a front-end position (not shown) and a rear-end position (the position in FIG. 1).

In addition, when the lock release lever 40 is in the locked position, the upper rail 30 is prevented from sliding with respect to the lower rail 21 because each locking portion 51 is engaged with the associated forward/rearward movement restriction groove 34 and lock groove 28 from below as shown in FIG. 8 and by solid lines in FIG. 11. On the other hand, rotating the lock release lever 40 down to the unlocked position causes each locking portion 51 which was engaged with some of the lock grooves 28 to be disengaged downward therefrom as shown by the phantom lines in FIG. 11, which allows the upper rail 30 to slide with respect to the lower rail 21.

The pair of left and right rail units 20 thus assembled are made to be parallel to each other and the positions thereof in the forward/rearward direction are made to coincide with each other (the sliding positions of the upper rails 30 with respect to the lower rails 21 are also made to coincide with each other); thereafter, a seating portion of a seat (not shown) is mounted onto the upper surfaces of the upper rails 30.

After the left and right rail units 20 and the seat are integrated in this manner, the loop handle (handle) 60 is connected to the left and right lock release levers 40 using the biasing springs (biaser) 70.

The loop handle 60 is made by bending a metal pipe member, and is provided with an operation portion 61 which extends in the leftward/rightward direction, a pair of oblique portions extending obliquely rearwardly downward from both left and right ends of the operation portion 61, and a pair of rear-end connecting portions 62 which respectively extend rearwardly from both left and right ends of the oblique portions. An upper contacting surface 63 and the lower contacting surface 64 of each rear-end connecting portion 62 are mutually parallel (horizontal) flat surfaces. The front end of each upper contacting surface 63 constitutes an upper supported portion 65, and the rear end of each lower contacting surface 64 constitutes a lower supported portion 66. Furthermore, a lock-engaging groove 67 which extends in the leftward/rightward direction is formed in the vicinity of the rear end of each upper contacting surface 63.

The loop handle 60 is connected to the lock release levers 40 by inserting the left and right rear-end connecting portions 62 into the internal spaces of the front ends of the lock release levers 40, respectively. Upon inserting the rear-end connecting portions 62, each rear-end connecting portion 62 enters into a space between the base-surface supporting portion 71 and the upper-surface pressing piece 72 (handle pressing portion 74), the base-surface supporting portion 71 contacts the lower contacting surface 64, the left and right downward-facing lock-engagement pieces 75 engage with the lock-engaging groove 67, and the handle pressing portion 74 comes in contact with the vicinity of the rear end of the upper contacting surfaces 63 (the periphery of the lock-engaging groove 67). Since upward/downward space between the base-surface supporting portion 71 and the handle pressing portion 74 is narrower than the upward/downward dimensions of the rear-end connecting portions 62 before the rear-end connecting portions 62 are inserted into each internal space of the front end portion of each lock release lever 40, when the rear-end connecting portion 62 is inserted in the space between the base-surface supporting portion 71 and the upper-surface pressing piece 72 (handle pressing portion 74), the upper-surface pressing piece 72 elastically deforms upwards, and the pressing force from the base-surface supporting portion 71 and the handle pressing portion 74 respectively applies against the lower contacting surface 64 and the upper contacting surfaces 63. Furthermore, the vicinity of the front end of the base-surface pressing piece 76, which has elastically deformed downwardly, comes in contact with the front portion of the lower contacting surface 64. Subsequently, the left and right rear-end connecting portions 62 and the front ends of the lock release levers 40 become integral with each other via the biasing springs 70, respectively, and each rear-end connecting portion 62 is, in effect, restricted from moving in the forward/rearward direction relative to the lock release lever 40.

Upon assembling the slide rail device 10 by integrating the loop handle 60 with the left and right rail units 20, as described above, since the rear-end connecting portions 62 constantly receive an upward biasing force from the base-surface pressing pieces 76 and constantly receive a downward biasing force from the upper-surface pressing pieces 72 (handle pressing portions 74), each upper supported portion 65 is constantly in contact (so as to be rotatable about an axis extending in the leftward/rightward direction) with the corresponding upper supporting portion 46, each lower supported portion 66 is constantly in contact with the associated base-surface supporting portion 71, and the base-surface supporting portion 71 is constantly in contact (so as to be rotatable about an axis extending in the leftward/rightward direction) with the associated lower support portion 38.

An assembled slide rail device 10 is attached to the vehicle interior floor by mounting the mounting brackets 15, to which the left and right lower rails 21 are mounted, onto the vehicle interior floor.

Operations of the slide rail device 10 will be hereinafter discussed.

When in a locked state in which no external force is applied against the loop handle 60, since the locking portions 51 of the lock spring 50 abut against the inner surfaces (lock surfaces) of the corresponding lock grooves 28 as shown in FIG. 11, no jolting occurs in the forward/rearward direction between the locking portions 51 (lock spring 50) and the lock grooves 28 (lower rail 21). Furthermore, since the supported portions 54 of the lock spring 50 are engaged with the V-grooves 37*a* of the intermediate lock-engaging lugs 37, which are formed on the upper rail 30, in a state such that movement in the forward/rearward direction is restricted, jolting in the forward/rearward direction also does not occur between the supported portions 54 (lock spring 50) and the intermediate lock-engaging lugs 37 (upper rail 30). Therefore, in a locked state, when an occupant is seated in the seat, even if a movement force in the forward/rearward direction is applied to the upper rail 30 due to the load incurred by the occupant sitting, an abnormal noise will not occur between the supported portions 54 and the intermediate lock-engaging lugs 37 nor between the locking portions 51 and the lock grooves 28 by the upper rails 30 and the lower rails 21 forwardly/rearwardly moving by a minute amount relative to the lock springs 50.

Upon the occupant grasping the operation portion 61 by hand and rotating the entire loop handle 60 upwards, this rotational force is transmitted from the rear-end connecting portions 62 to the front end portions of the lock release levers 40, so that the lock release levers 40 rotate upwardly with the rear-end connecting portions 62. Accordingly, since the lock release levers 40 that were positioned at the locked position rotate to the unlocked position, the upper rails 30, which were restricted from sliding relative to the lower rail 21, become slidable relative to the lower rails 21.

In this state, details of the rotational operation of each rear-end connecting portion 62 and the associated lock release lever 40 are as follows.

As shown in FIGS. 12 and 17, when the occupant does not apply force on the loop handle 60, since the upper supported portion 65 and the lower supported portion 66 come in surface contact with the upper supporting portion 46 and the base-surface supporting portion 71, respectively, the rear-end connecting portion 62 is held at a position such that the axis of the rear-end connecting portion 62 coincides with the axis of the front end portion of the lock release lever 40. Upon the loop handle 60 being rotated upward from this state, the left and right rear-end connecting portions 62 relatively rotate with respect to the upper rails 30 about the contacting portion between the upper supporting portion 46 and the upper supported portion 65 and about the contacting portion between the lower support portions 38 and the base-surface supporting portion 71, and furthermore, the rear end portion of the lock release lever 40, the upper supporting portion 46 of which is pressed upwards by the upper supported portion 65, rotates downwardly about the rotational contact protrusion 42 (P) (see FIG. 13 and FIG. 18). An upward lifting force F1 of the operation portion 61 that the occupant applies is:

$F1=F\times L1/L2\times L3/L4$, wherein, when the occupant does not apply force on the loop handle 60, L1 designates the distance in the forward/rearward direction from point A (the action position of the spring pressing-pieces 43 against the locking portions 51), to point B (the position of the rotational contact protrusion 42, i.e., the rotational center position of the lock release lever 40); L2 designates the distance in the forward/rearward direction from point B to point C (the upper supporting portion 46); L3 designates the distance in the forward/rearward direction from point C to point D (lower support portions 38); L4 designates the distance in the forward/rearward direction from point C to point E (operation portion 61); and F designates the downward movement force that the spring pressing-pieces 43 apply onto the lock spring 50 when the lock release lever 40 is moved to the unlocked position (the locking portions 51 escape downward from the lock grooves 28).

Whereas, as shown in the comparative embodiment of FIG. 19, in the case of a configuration (a configuration in which the rear-end connecting portion 62 is fixed to the lock release lever 40) in which the rear-end connecting portion 62 rotates coaxially with the lock release lever 40, an upward lifting force F2 of the operation portion 61 that the occupant applies is:

$F2=F\times L1/(L2+L4)$.

In the present embodiment, since L1=125.7 mm, L2=96.0 mm, L3=36.5 mm, L4=115.1 mm:

$F1=0.42F$ $F2=0.60F$

Therefore, the occupant can carry out a lock release with a smaller force than in the case of the comparative embodiment of FIG. 19.

Furthermore, if point D is positioned further forward than point B, the upward rotational angle β of the loop handle (operation portion 61) relative to the upper rail 30, regardless of the dimensions of L1 through L4, is larger than the rotational angle α of the lock release lever 40 relative to the upper rail 30 (in the case of FIG. 19, the rotational angle of the loop handle 60 is also α). Accordingly, since the locked state is not released unless the occupant lifts the operation portion 61 upward by a reasonably large rotational angle, it is possible to give a comfortable operational feel to the occupant.

Furthermore, as shown in the drawings, since the lock release lever 40 is provided in an internal space of the upper rail 30, the rotatable range of the lock release lever 40 in the upward/downward direction is restricted to a narrow range. However, since the upward rotational angle (α) of the lock release lever 40 when carrying out a lock release is smaller than the upward rotational angle (β) of the loop handle 60, a lock release can be reliably carried out without making the lock release lever 40 contact the inner surface of the upper rail 30.

Next, a second embodiment of the present invention will be described while referring to FIG. 20 and FIG. 21. Members that are the same as those in the first embodiment are designated with the same designators, and a detailed description thereof have been omitted.

In a rail unit 20' of this embodiment, the supporting arrangement of the lock spring 50 by the upper rail 30 is different to that of the first embodiment.

Figure 20:
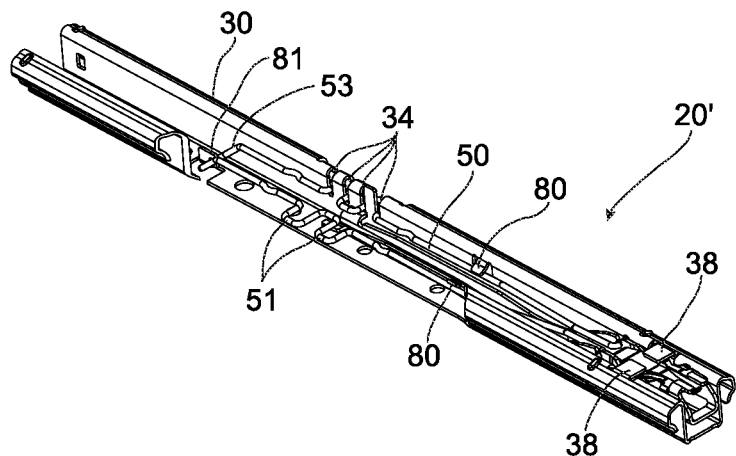
FIG. 20 is a perspective view, similar to that of FIG. 8, of a second embodiment.
Figure 21:
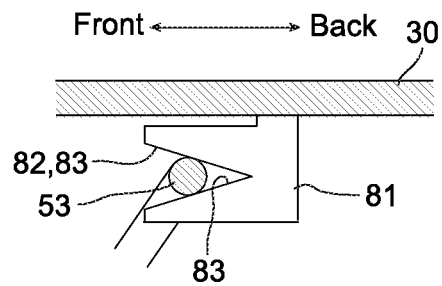
FIG. 21 is a longitudinal sectional view of the rear portion of the upper rail.
Figure 22:
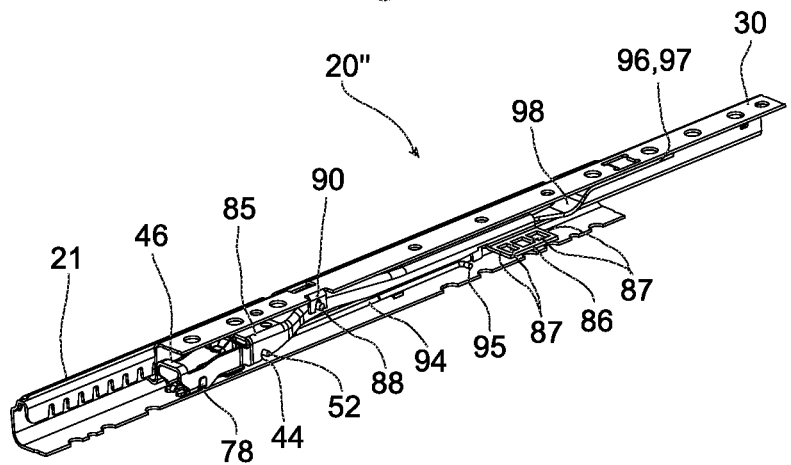
FIG. 22 is a perspective view, similar to that of FIG. 6, of a third embodiment.

As shown in FIG. 20, instead of the intermediate lock-engaging lugs 37, the upper rail 30 of the rail unit 20' is provided with intermediate lock-engagement pieces 80, which extend inwards and obliquely upward and are respectively formed, by cutting and raising, on the left and right side walls of the base 31 at a position slightly forward from the central portion of the upper rail 30. Furthermore, a rear-end support (support) 81 which extends downwardly is provided on the portion near the rear end the roof underside portion of the base 31, and a V-groove (support groove) 82 which extends rearwardly is formed at the front edge of the rear-end support 81. As shown in FIG. 21, a pair of supporting surfaces 83 which form the upper surface and the lower surface of the V-groove 82 are vertically symmetrical, and the upward/downward space therebetween gradually and mutually narrows with respect to the rearward direction.

In the present embodiment, the part of the lock spring 50 which is positioned slightly forward from the locking portions 51 of the left and right side portions of the lock spring 50 is lock-engaged with the left and right intermediate lock-engagement pieces 80 (between the intermediate lock-engagement pieces 80 and the side walls of the base 31) from above, and the rear end portion (supported portion) of the rear-end lock-engaging portion 53 that extends in the leftward/rightward direction is engaged with the V-groove 82 from the front side thereof. Upon supporting the lock spring 50 on the upper rail 30 in the above-described manner, the lock spring 50 generates a biasing force in the same manner as that in the first embodiment, and part of the component force of this biasing force becomes the biasing force (engagement-assisting biasing force) for moving the rear-end lock-engaging portion 53 rearward. Therefore, when the rear-end lock-engaging portion 53 reaches a predetermined forward/rearward position, two upper and lower positions of the rear-end lock-engaging portion 53 contact both of the upper and lower supporting surfaces 83 by the above-mentioned component force (engagement-assisting biasing force), so that a contacting state is maintained by this biasing force.

Since jolting in the forward/rearward direction between the rear-end lock-engaging portion 53 (lock spring 50) and the rear-end support 81 (upper rail 30) is prevented in such a manner, the rail unit 20' (10) of the present embodiment can also exhibit the same effects as those of the first embodiment.

Next, a third embodiment of the present invention will be described while referring to FIGS. 22 through 26. Members that are the same as those in the previous embodiments are designated with the same designators, and a detailed description thereof have been omitted.

A rail unit 20" of this embodiment is provided with a lock lever 85 instead of the lock release lever 40. The fundamental structure of the lock lever 85 is the same as that of the lock release lever 40, and is provided with the side walls 41, the spring-hook grooves 44, the roof hole 45, the upper supporting portion 46, the spring-hook recess 47, and the underside supporting pieces 48; the loop handle 60 is connected to the front end of the lock lever 85. Whereas, a pair of left and right horizontal lock-plates 86 are provided on the rear end of the lock lever 85. As shown in the drawings, each of the horizontal lock-plates 86 is provided with three rectangular through-holes formed therethrough, and the three rectangular through-holes define a total of four locking portions 87 which are arranged at equal intervals in the forward/rearward direction on the front and rear sides of the three rectangular holes, respectively. Furthermore, a pair of left and right cylindrical supported portions 88 which extend in the leftward/rightward direction are provided at the front portion of the lock lever 85.

Figure 23:
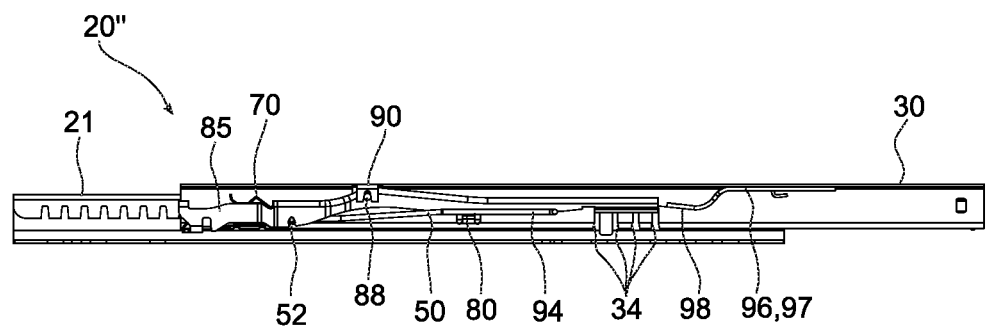
FIG. 23 is a longitudinal sectional view of the rail unit.
Figure 24:
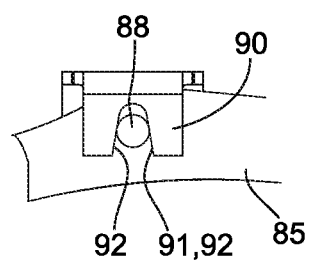
FIG. 24 is a enlarged plan view of a rotational supporting piece and a supported portion.
Figure 25:
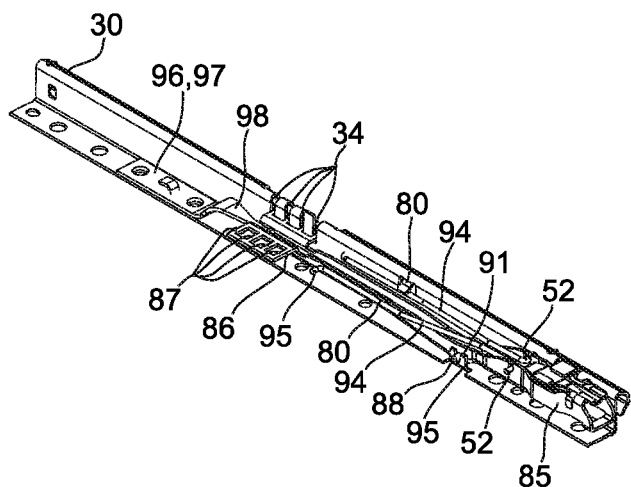
FIG. 25 is a perspective view similar to that of FIG. 7.
Figure 26:
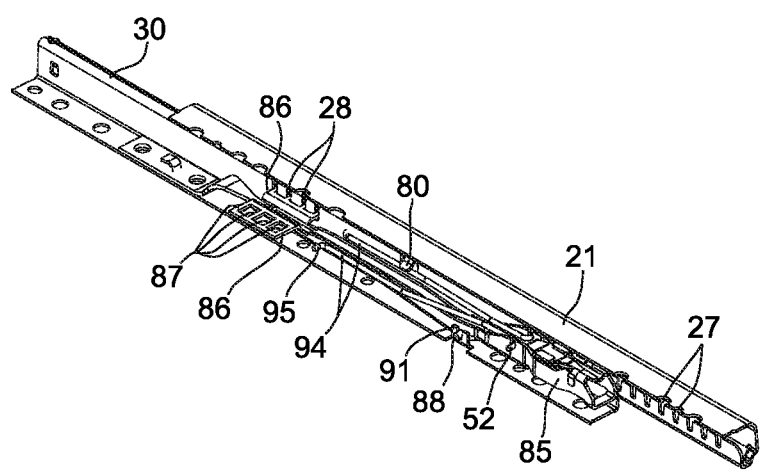
FIG. 26 is a perspective view similar to that of FIG. 8.
Figure 27:
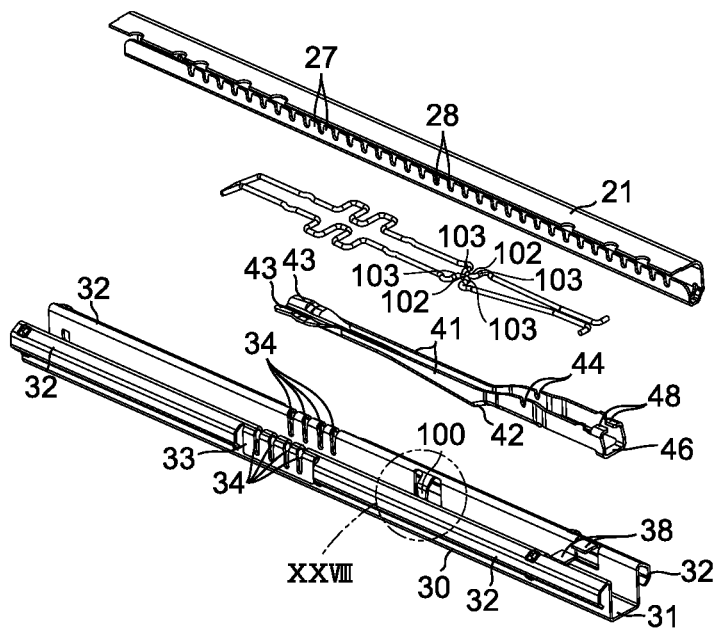
FIG. 27 is an exploded perspective view, similar to that of FIG. 5, of a modified embodiment.
Figure 28:
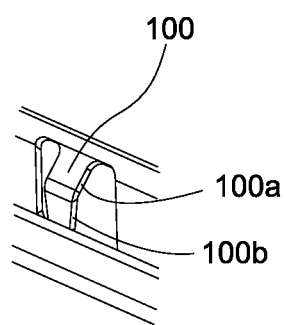
FIG. 28 is an enlarged view of the XXVIII section of FIG. 27.
Figure 29:
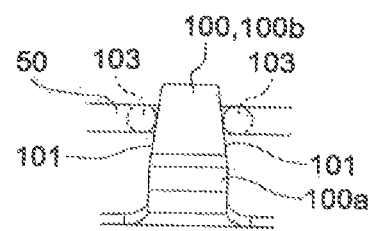
FIG. 29 is an enlarged side elevational view of the same section as that of FIG. 28, when the lock spring is lock-engaged.
Figure 30:
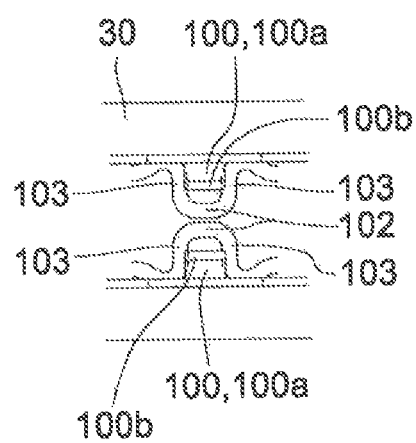
FIG. 30 is an enlarged underside plan view of the same section as that of FIG. 28, when the lock spring is lock-engaged.

A pair of left and right rotational support members 90 are formed on the roof underside portion of the base 31 of the upper rail 30 by being cut and raised downwards. As shown in FIG. 23, a V-groove (supporting groove) 91 which extends upward is formed in the lower edge of each rotational support member 90. As shown in the drawings, a pair of supporting surfaces 92 which define a front surface and a rear surface of each V-groove 91 are bisymmetrical in the forward/rearward direction and the mutual distance therebetween in the forward/rearward direction gradually narrows with respect to the upward direction. The left and right supported portions 88 of the lock lever 85 engage with the V-grooves 91 of the left and right rotational support members 90, respectively, from below. Furthermore, the locking portions 87 of the left and right the horizontal lock-plates 86 are engaged with the left and right forward/rearward-movement restricting grooves 34 from below. Although not shown in the drawings, the locking portions 87 of the horizontal lock-plates 86 are disengageably-engageable with the lock grooves 28 of the lower rail 21 from below.

Furthermore, instead of the lock spring 50, the slide rail device 20" is provided with a pair of left and right front biasing springs (lock biaser) 94 formed by a metal wire rod. The left and right front biasing springs 94 are mutually bilaterally symmetrical, and are provided with front-end lock-engaging lugs 52 at the front ends thereof which engage with the spring-hook grooves 44, respectively. The rear ends of the left and right front biasing springs 94 are provided with rear-end lock-engaging lugs 95, having the same shape as that of the front-end lock-engaging lugs 52, which respectively fit into support through-holes (not shown) respectively formed through the left and right side walls of the base 31 of the upper rail 30. Furthermore, the intermediate portions of the left and right front biasing springs 94 are lock-engaged with intermediate lock-engaging members 80 (between the intermediate lock-engaging members 80 and the side walls of the base 31) from above, so that the left and right front biasing springs 94 generate a biasing force. Furthermore, an upward biasing force (engagement-assisting biasing force), which is part of the component force of above-mentioned biasing force, is applied from the left and right front-end lock-engaging lugs 52 to the lock lever 85 (spring-hook grooves 44). Accordingly, due to this upward biasing force (engagement-assisting biasing force), the left and right supported portions 88 move up into the V-grooves 91, so that when the left and right supported portions 88 reach a predetermined vertical position, each left and right supporting portion 88 contacts the pair of front and rear supporting surfaces 92 at two forward/rearward points, and this contacting state is maintained by the above-mentioned biasing force. Accordingly, the lock lever 85 is rotatable about the supported portions 88 without jolting in the forward/rearward direction with respect to the upper rail 30.

Furthermore, a base part 97 which forms a rear portion of a metal rear biasing spring (biaser) 96 is fixed to a rear portion of the underside surface of the roof of the base 31 of the upper rail 30. An elastically-deformable portion 98 is provided on the base part 97 so as to extend therefrom in the forward direction, and since the upper surface of the elastically-deformable portion 98 is constantly biasing the rear end of the lock lever 85 upward, the engagement of the locking portions 87 of the lock-plates 86 with the forward/rearward-movement restricting grooves 34 is constantly maintained. Furthermore, since the engagement between the cylindrical supporting portions 88 of the lock lever 85 and the V-grooves 91 is maintained due to the front biasing springs 94 and the elastically-deformable portion 98 applying an upward biasing force on the lock lever 85, the lock lever 85 is rotatable about the supporting portions 88 with respect to the upper rail 30. Furthermore, since the biasing force of the elastically-deformable portion 98 is larger than the biasing force of the front biasing springs 94, when an operational force is not applied to the loop handle 60, the lock lever 85 is positioned in a locked position (the position shown in FIG. 23) in which the locking portions 87 are engaged with the corresponding lock grooves 28. Whereas, if the occupant lifts the loop handle 60 upward against the biasing force of the elastically-deformable portion 98 (and the left and right front biasing springs 94), the lock lever 85 is rotated down to the unlocked position (not shown) at which the locking portions 87 disengage (escape) downwardly from the corresponding lock grooves 28.

Hence, since jolting in the forward/rearward direction between the left and right cylindrical supported portions 88 (lock lever 85) and the rotational support members 90 (upper rails 30) can be prevented, even if a movement force in the forward/rearward direction is applied against the upper rails 30 in a locked state, in which the locking portions 87 are engaged with the forward/rearward movement restriction grooves 34, no abnormal noise is generated between the supported portions 88 and the V-groove 91 nor between the locking portions 87 and the forward/rearward movement restriction grooves 34, and the rail unit 20" (slide rail device 10) can also exhibit the same effects of those of the previous embodiments.

Although the present invention has been described based on the above illustrated embodiments, various modifications can be made to the above illustrated embodiment.

For instance, in each of the above-described embodiments, a groove having pair of supporting surfaces (V-grooves 37a, and 91) is formed in the upper rail 30 and the forward/rearward movement of the lock spring 50 or the lock lever 85 can be restricted; however, a projection having a pair of supporting surfaces can be formed on the upper rail 30.

FIGS. 27 through 30 is a modified embodiment of the first embodiment, to which this technical concept is applied.

Instead of the intermediate lock-engaging lugs 37, a pair of support projections (supporting portions) 100 project inwards and are formed, by raising and cutting, on the left and right side surfaces of the base 31 of each upper rail 30. The width in the forward/rearward direction of a lower half 100a of each support projection 100 is substantially constant, and each lower half 100a extends upward while inclining, in a front elevational view. As shown in the drawings, both the side-surface shape and the base-surface shape of an upper half 100b of each support projection 100 are trapezoidal in shape. Both of the front and rear sides of the upper half 100b define a pair of supporting surfaces 101, the forward/rearward space therebetween gradually narrowing with respect to the inward direction (the left support projection 100 toward the right, and the right support projection 100 toward the left).

A pair of supported portions 102, which mutually extend in directions that approach each other, are provided on the lock spring 50 at an intermediate portion with respect to the longitudinal direction at left and right side portions thereof, and each supported portions 102 is provided with a pair of front and rear clamping portions 103. The left and right supported portions 102 engage, from the inner side, with the upper halves 100b (and between the side walls of the upper rail 30) of the left and right support projections 100, and the front and rear clamping portions 103 respectively face the front and rear supporting surfaces 101.

Upon attaching the lock spring 50 to the upper rail 30, since part of the component force of the biasing force that is generated by the lock spring 50 becomes a biasing force (engagement-assisting biasing force) which moves a middle portion (the peripheral portion around the supported portions 102) of the lock spring 50 mutually away from each other, the left and right supported portions 102 are biasedly moved in directions mutually away from each other by this component force. Thereafter, when the supported portions 102 reach predetermined leftward/rightward positions, the front and rear clamping portions 103 of each supported portion 102 contact both of the front and rear supporting surfaces 101 of the upper half 100b of each support projection 100, and since this contacting state is maintained by this biasing force, the lock spring 50 is supported without jolting in the forward/rearward direction with respect to the upper rail 30. Accordingly, the same effect as that of the first embodiment can be obtained in this modified embodiment.

The technical concept of this modified embodiment can be applied to the second and third embodiments.

Note that the shape of the supporting groove (the V-grooves 37a, 82 and 91) of the supporting portion is not limited to the above-described shapes; any shape is acceptable so long as the shape is such that the supported portion contacts the pair of supporting surfaces when the biasing force (engagement-assisting biasing force) of the lock spring 50 or the biaser (front biasing springs 94, the rear biasing spring 96) is applied to the supported portions 54, 88, or 102 (rear-end lock-engaging portion 53).

INDUSTRIAL APPLICABILITY

In the slide rail device for a vehicle according to the present invention, a movable member can be supported without jolting relative to the upper rail by utilizing a supporting portion and a supported portion formed on one and the other of the upper rail and the movable member.

REFERENCE SIGNS LIST

10 Slide rail device
15 Mounting bracket
20 20' 20" Rail unit
21 Lower rail
22 Bottom wall
23 Outer wall portion
24 Roof underside portion
25 Inner wall portion (vertical wall)
26 Base-end supporting portion
27 Lock teeth
28 Lock grooves
30 Upper rail
31 Base
32 Upright walls
33 Locking walls
34 Forward/rearward movement restriction grooves
36 Lock-engaging lug
37 Intermediate lock-engaging lug (supporting portion)
37a V-groove (supporting groove)
37b Supporting surfaces
38 Lower support portion
40 Lock release lever
41 Side walls
42 Rotational contact protrusion
43 Spring pressing-piece
44 Spring-hook groove
45 Roof hole
46 Upper supporting portion
47 Spring-hook recess
48 Underside supporting pieces
50 Lock spring
51 Locking portions
52 Front-end locking lugs
53 Rear-end lock-engaging portion (supported portion)
54 Supported portions
55 Retainers
56 Bearing balls
60 Loop handle (handle)
61 Operation portion
62 Rear-end connecting portion
63 Upper contacting surface
64 Lower contacting surface
65 Upper supported portion
66 Lower supported portion
67 Lock-engaging groove
70 Biasing spring (biaser)
71 Base-surface supporting portion
72 Upper-surface pressing piece
73 Insertion end
74 Handle pressing portion
75 Downward-facing lock-engagement pieces
76 Base-surface pressing piece
77 Side arm 78 Upward-facing lock-engagement pieces
80 Intermediate lock-engagement pieces
81 Rear-end support (supporting portion)
82 V-groove (support groove)
83 Supporting surface
85 Lock lever
86 Horizontal lock-plates
87 Locking portions
88 Supported portions
90 Rotational support members
91 V-groove (supporting groove)
92 Supporting surfaces
94 Front biasing spring (biaser)
95 Rear-end lock-engaging lugs
96 Rear biasing spring (biaser)
97 Base part
98 Elastically-deformable portion
100 Support projection (support member)
101 Supporting surfaces
102 Supported portions
103 Clamping portions
P Contact portion

The invention claimed is:

1. A slide rail device for a vehicle comprising:
a lower rail which extends in a forward and rearward direction and is provided with a large number of lock grooves, extending in an upward and downward direction, which are arranged in the forward and rearward direction, said lower rail being immovable relative to a floor of the vehicle;
an upper rail which is supported by said lower rail to be slidable in said forward and rearward direction and provided with a supporting portion;
a lock spring which is provided with a supported portion, which is supported by said supporting portion, and a locking portion which is disengageably-engageable with said lock grooves, wherein a biasing force of said lock spring biases said locking portion in a direction to engage with said lock grooves; and
a lock release lever, supported by said upper rail, which is rotatable between a locked position, at which said locking portions allowed to engage with said lock grooves, and an unlocked position, at which said lock spring presses in a direction such that said locking portion escapes from said lock grooves against said biasing force,
wherein said lock spring generates an engagement-assisting biasing force in a same direction or a different direction from an engaging direction of said locking portion with said lock grooves, and
wherein said supporting portion is provided with a pair of supporting surfaces, the space therebetween becoming mutually narrower with respect to the direction of said engagement-assisting biasing force, so that when said supported portion is positioned at a predetermined position by said engagement-assisting biasing force, said supported portion engages with both of said pair of supporting surfaces, so that forward and rearward movement of said supported portion relative to said supporting surfaces is restricted.

2. The slide rail device for said vehicle according to claim 1, wherein said supporting portion comprises a supporting groove having a cross-sectional plane that is substantially orthogonal to the left and right direction, wherein one end of said supporting groove is open and the width of said supporting groove becomes narrower toward the closed end thereof, wherein said supported portion extends in the left and right direction.

3. The slide rail device for said vehicle according to claim 2, wherein said supporting groove comprises a V-groove.

4. The slide rail device for said vehicle according to claim 1, wherein said supporting portion comprises a support projection, front and rear surfaces of which constitute said supporting surfaces, and wherein said supported portion is provided with a pair of front and rear clamping portions, which forwardly and rearwardly face front and rear said supporting surfaces.

5. The slide rail device for said vehicle according to claim 1, wherein said supported portion has a round cross-sectional shape.

6. A slide rail device for a vehicle comprising:
a lower rail which extends in a forward and rearward direction and is provided with a large number of lock grooves, extending in an upward and downward direction, which are arranged in the forward and rearward direction, said lower rail being immovable relative to a floor of the vehicle;
an upper rail which is supported by said lower rail to be slidable in said forward and rearward direction and provided with a supporting portion;
a lock lever which is provided with a locking portion which is disengageably-engageable with said lock grooves, and a supported portion, supported by said supporting portion, which is rotatable between a locked position, at which said locking portion engages with said lock grooves, and an unlocked position, at which said locking portion escapes from said lock grooves; and
a biaser which is supported by said upper rail and biases said lock lever toward said locked position,
wherein said biaser generates an engagement-assisting biasing force in a same direction or a different direction from an engaging direction of said locking portion with said lock grooves,
wherein said supporting portion is provided with a pair of supporting surfaces, the space therebetween becoming mutually narrower with respect to the direction of said engagement-assisting biasing force, so that when said supported portion is positioned at a predetermined position by said engagement-assisting biasing force, said supported portion engages with both of said pair of supporting surfaces, so that forward and rearward movement of said supported portion relative to said supporting surfaces is restricted.

* * * * *